April 1, 1952 — W. G. CATLETT — 2,590,934
PORTABLE FERRIS WHEEL
Filed Aug. 26, 1949 — 3 Sheets-Sheet 3
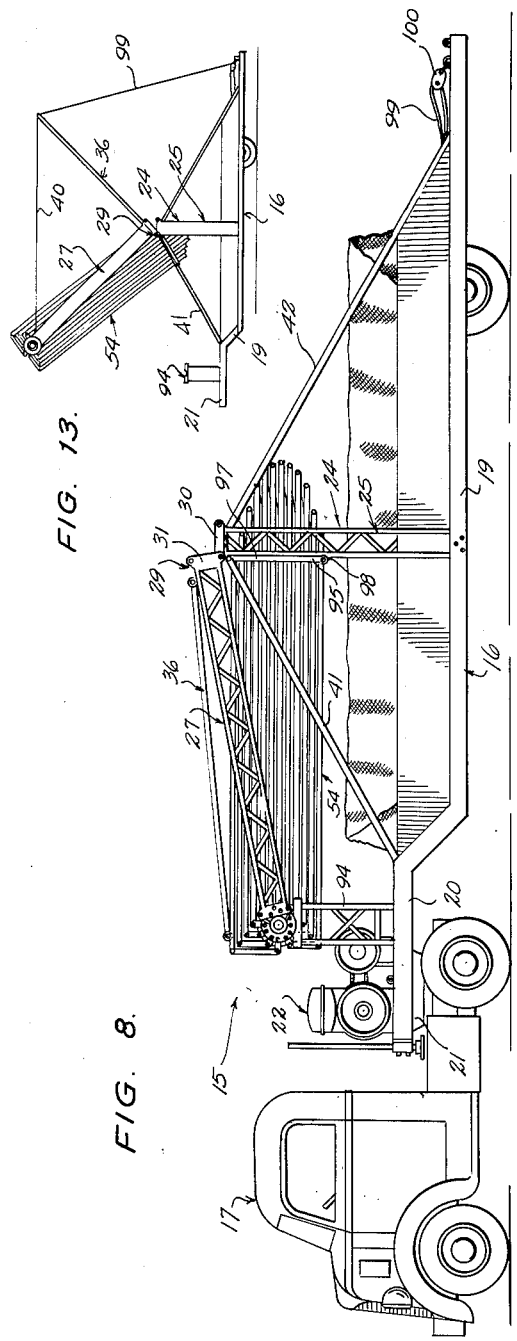
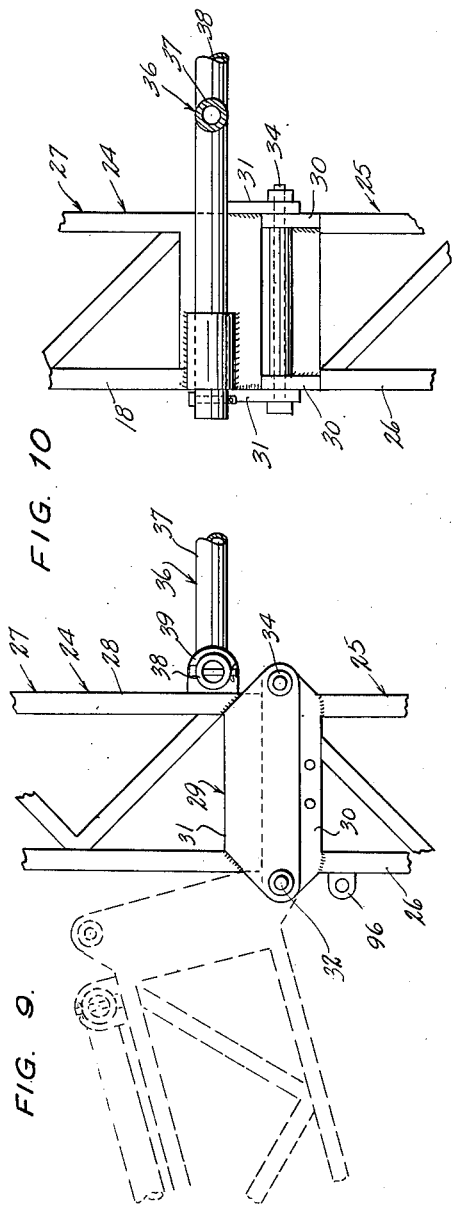
INVENTOR.
WILLIAM G. CATLETT,
BY
McMorrow, Berman + Davidson
ATTORNEYS.

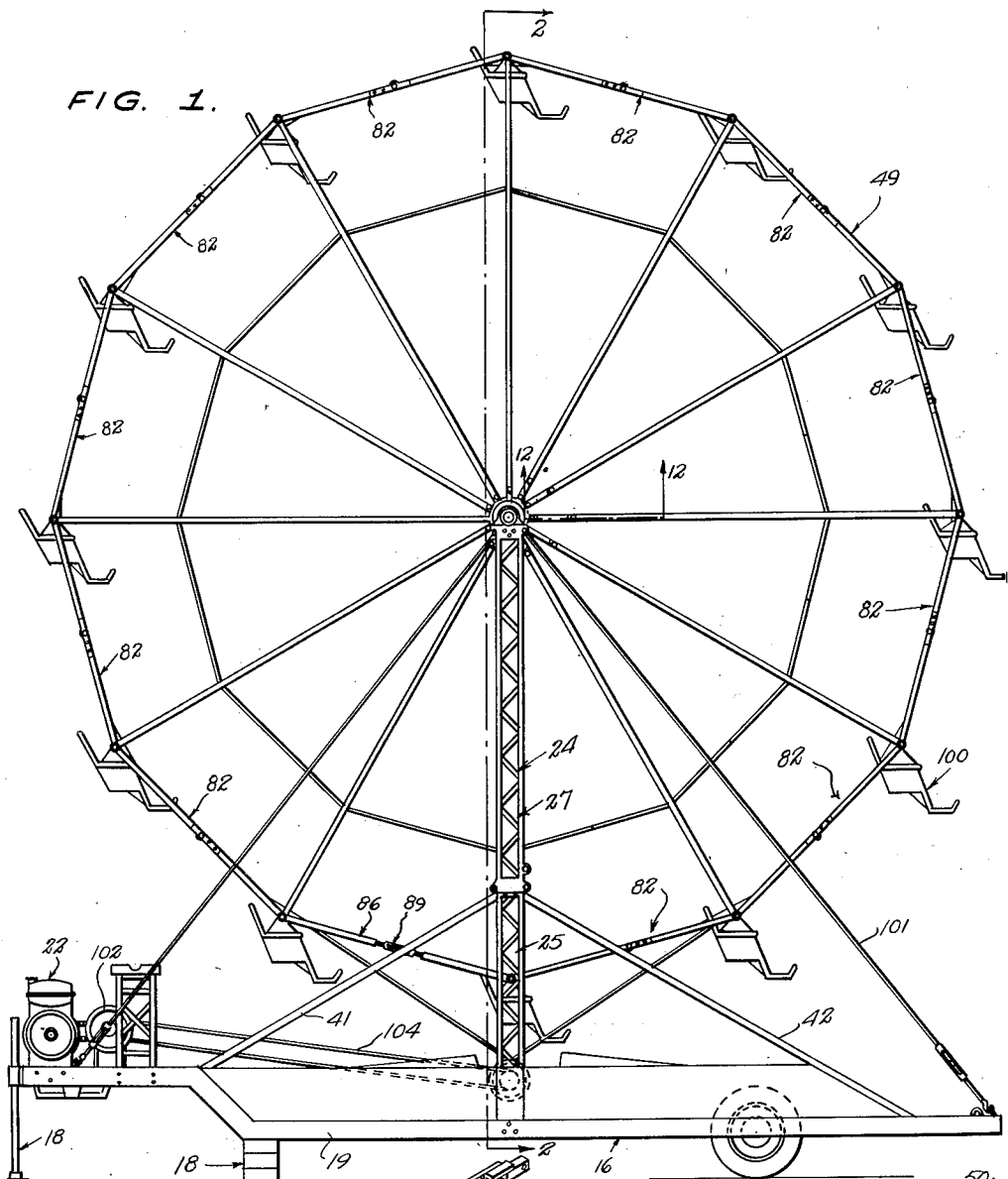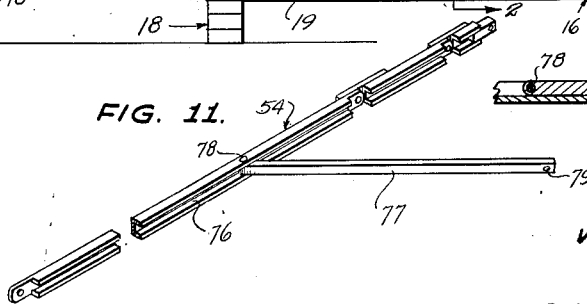

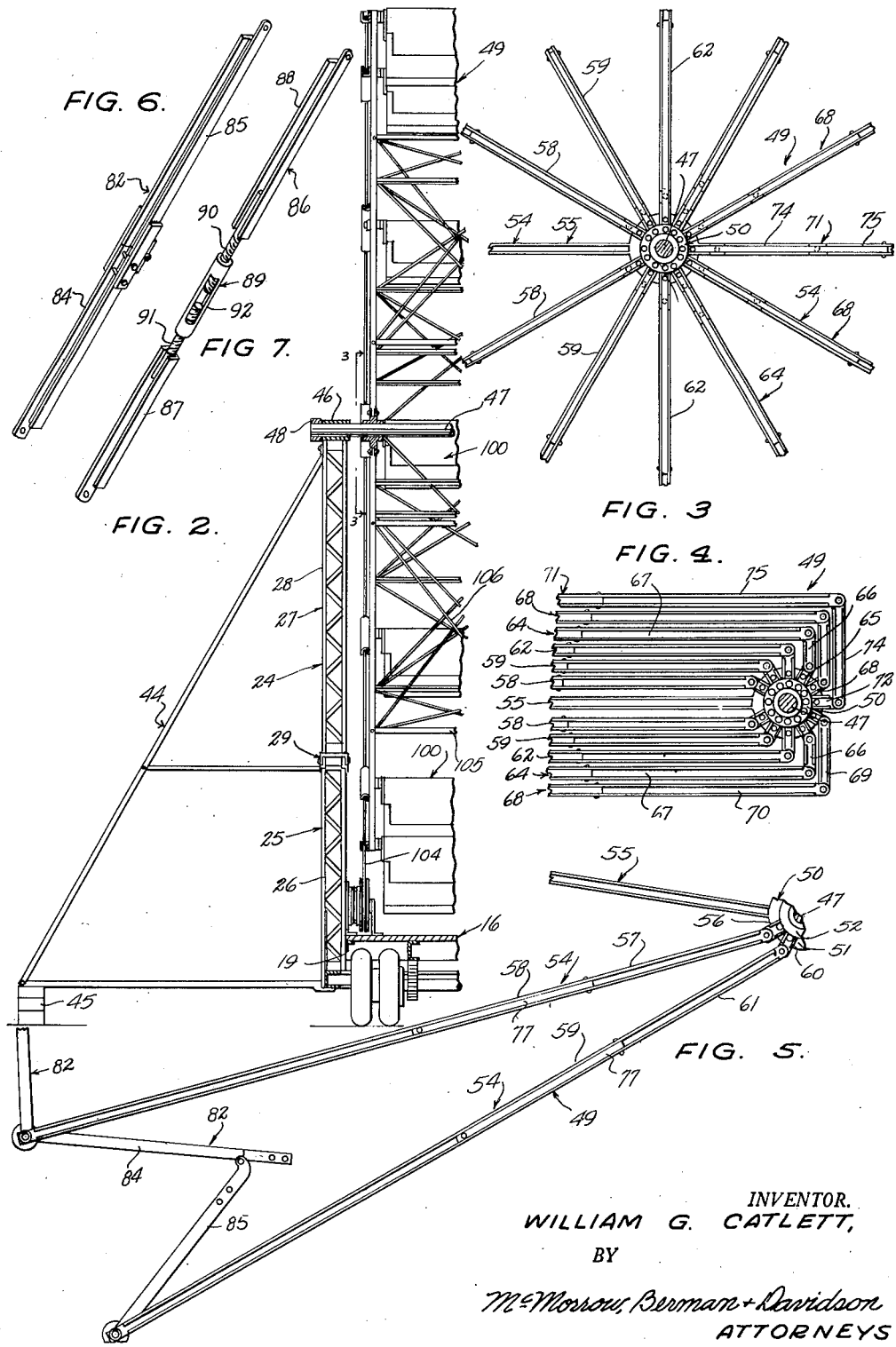

Patented Apr. 1, 1952

2,590,934

UNITED STATES PATENT OFFICE 2,590,934

PORTABLE FERRIS WHEEL

William G. Catlett, Kansas City, Kans.

Application August 26, 1949, Serial No. 112,550

2 Claims. (Cl. 272—29)

This invention relates to a Ferris wheel, and more particularly to a foldable portable amusement device of this kind.

It is an object of this invention to provide a Ferris wheel of the kind to be more particularly described hereinafter, which is supported on a mobile base having the related parts and sections hingedly connected together for swinging from a folded or collapsed position to an extended, erect and operable position. Locking members are hingedly connected to the articulated wheel spokes for rigidly securing the spokes in their extended position as pivoted on the rotatable hub.

Another object of this invention is to provide a Ferris wheel of this kind which may be readily folded from a collapsed position to an extended operating position, the folding sections being hingedly connected to the respective adjacent sections at all times, thereby appreciably expediting the assembly and disassembly of the wheel. The speedy and efficient conversion of the Ferris wheel results in a considerable saving in time and labor generally acquired for amusement devices of this kind which are constantly being moved from one location to another, as at carnivals, fairs and the like.

With the above and other objects in view, my invention consists in the arrangement, combination and details of construction disclosed in the drawings and specification, and then more particularly pointed out in the appended claims.

In the drawings:

Figure 1 is a side elevation of a portable and collapsible Ferris wheel constructed according to an embodiment of my invention, with the tractor removed;

Figure 2 is a transverse section taken on the line 2—2 of Figure 1;

Figure 3 is a side elevation, partly broken away, showing the wheel spokes in their extended relation to the hub about which they are pivotally mounted;

Figure 4 is a side elevation, partly broken away, showing the wheel spokes in their folded or collapsed position;

Figure 5 is a side elevation, partly broken away, showing the partially extended wheel spokes and the relation between a pair of spokes and the rim rods between adjacent spokes;

Figure 6 is a perspective view of one of the wheel rim rods removed from the assembly;

Figure 7 is a perspective view of the one longitudinally-adjustable wheel rim member removed from the assembly;

Figure 8 is a side elevation of the portable Ferris wheel showing the wheel in its completely folded or collapsed position on the trailer or mobile base frame;

Figure 9 is a side elevation, partly broken away, showing the connection of the extended tower sections in full lines and the relation of the folded tower sections in dotted lines;

Figure 10 is a front elevation, partly broken away, of the connection between the tower sections and the engagement of the tower-erection member with the upper tower section;

Figure 11 is a perspective view of one of the wheel spoke members removed from the assembly;

Figure 12 is a longitudinal section of one end of one of the spoke members showing the connection of the spoke member to the wheel hub and showing the engagement of the locking member in its locking position;

Figure 13 is a diagrammatic view of the Ferris wheel, showing the position of the Ferris wheel and the erecting member with the Ferris wheel tower sections partially extended.

Referring to the drawings, the numeral 15 designates generally a portable and foldable Ferris wheel constructed according to an embodiment of this invention. The Ferris wheel 15 is mounted on a mobile base or supporting member designated by the numeral 16 which represents the frame of a trailer assembly to be connected to a suitable tractor 17 at the forward end thereof. The foldable Ferris wheel 15 is adapted to be conventionally folded on the frame or trailer 16 to be transported about to a selected location by the tractor portion 17. When the Ferris wheel 15 has been located at a position where it will be extended and operated, the tractor 17 is disengaged from the forward end of the trailer 16 and the forward end of the trailer 16 will be suitably supported by jacks or bracing members 18, as clearly shown in Figure 1 of the drawings. The frame 16 includes a lower longitudinally-extending portion 19 on which the Ferris wheel is to be supported and an upwardly-offset forward portion 20 on which is mounted a fifth wheel 21 for engagement with the tractor 17. An engine or motor 22 is mounted on the portion 20 for driving engagement with the Ferris wheel 15 in its extended and operable position.

A tower 24 is fixedly supported on the supporting base or trailer 16 and is formed of a plurality of hingedly connected sections. A lower section 25, which includes a pair of transversely-spaced-apart, vertically-extending lower tower members 26, is fixed to the base 16 and the upper tower section 27, which includes a pair of transversely-spaced-apart tower-forming members 28, is hingedly connected at its lower end to the upper end of the lower tower section 25.

A hinge member 29 is fixed between the adjacent ends of the related tower-forming sections 26 and 28 and includes a longitudinally-extending flat plate 30 fixed to the upper ends of the lower tower sections 26 and extending forwardly and rearwardly beyond the side edges thereof. An upper plate 31 is fixed to the lower end of each of the upper tower-forming members 28 and extends slightly forwardly of the forward side thereof and slightly rearwardly of the rear side thereof, the forwardly-extending portions constituting the hinge-bearing section and a hinge or pivot pin 32 is adapted to be engaged through the forwardly-extending portions of the plates 30 and 31 of the respective tower sections 25 and 27. A locking pin 34 is adapted to be engaged through the rearwardly-extending portions of the correlated plates 30 and 31 of the respective tower sections 25 and 27 for fixedly securing the tower sections in their extended positions. The locking pin or member 34 is removably engaged through the rearwardly-extending portions of the plates to provide for the free swinging of the upper tower section 27 forwardly about the pivot pin 32 when the locking member 34 is disengaged.

Erecting means 36 is connected to the lower end of the upper tower section 27 for raising the upper tower section into an erect position and is swingable from an overlying position, as clearly shown in Figures 8 and 9 of the drawings, to an upwardly-extending position, as shown in the diagrammatic view of Figure 13. The erecting means 36 includes a bar 37 fixedly connected to a transverse hinge member 38. The hinge member 38 is rotatably supported in a pair of hinge bearings 39 carried by the opposite tower-forming members 28 of the upper tower sections 27 at the lower ends thereof. The hinge bearings 39 are fixed on the upper and rear side of the upper tower section 27 and the tower-erecting bar 37 is adapted to be actuated and supported in its extended and erecting position by a flexible member 40 which is connected to the outer end of the erecting bar 37 and to the forward and upper end of the upper tower section 27.

A pair of forwardly-extending supporting bars or rods 41 are fixed at their rear ends to the upper ends of each of the lower tower sections 26 and at their forward ends to the frame or supporting member 19. Similar supporting braces 42 are fixed at their forward ends to the upper ends of the lower tower members 26 and extend downwardly and rearwardly to be fixedly secured to the lower end of the frame 19.

Outwardly-extending wind members 44 are adapted to be fixedly secured to the tower 24 on each side of the wheel 15 when the wheel is erected for suitably supporting the wheel 15 against swinging movement transversely of the tractor 16 and frame 19. The wind members 44 are removably engaged on the tower sections 26 and are supported above the ground by suitable jacks or bracing members 45.

A bearing 46 is fixedly mounted on the upper end of each of the upper tower members 27 for rotatably supporting the axle 47 of the wheel 49 to be rotatably supported between the transversely-spaced-apart tower sections 24. The axle 47 is formed with a collar 48 on the extreme outer ends thereof which is rotatably engageable with the outer surface of the bearing members 46 on the outer sides of the tower members 24 for holding the wheel section 49 against transverse sliding movement relative to the tower members for providing for the suitable rotation of the wheel 15 therebetween.

The wheel sections 49 which are cooperatively rotatable between the tower members 24 are formed with a central hub 50 having a heavy flange 51 at the opposite sides or ends thereof. Each of the wheel sections 49 is identically formed and, therefore, only one will be described in detail. The flanges 51 are annular in configuration engaging about the periphery of the central portion 52 of the hub 50 and are formed for receiving the inner ends of the radially-extending wheel spokes 54.

One wheel spoke 55 is designed as the master spoke and is fixedly secured at its inner end to the flange 51 on one side of the hub 50. The fixed or master spoke 55 is fixed at one end to the hub 50 and is rigid along the entire length thereof forming the master or base portion of the wheel 49. The other spokes 54 are articulated and certain of them are formed in different manners to provide for the use and operation of the folding wheel to be described more particularly hereinafter.

Certain of the articulated spokes 54 are formed with a single hinge connection to the hub 50, while other of the spokes 54 are formed with a double hinge connection to provide for the folding arrangement of the spokes in the collapsed or folded position of the Ferris wheel 15. The wheel spokes 58 immediately adjacent the fixed spoke 55 on the opposite sides thereof are formed with a short section 56 which is fixed at its inner end to the flange 51 and an outer section 57 which is pivotally connected to the outer end of the inner section 56. Spokes 59 are hingedly connected to the hub 50 and radiate outwardly therefrom in spaced circumferential fashion from the fixed spoke 54. The spokes 59 are formed in substantially the same manner as the hinged wheel spokes 58 described above, but the inner section 60 of each wheel spoke 59 is slightly longer than the inner section 56 of the spokes 58 and the outer section 61 of the spokes 59 is slightly shorter than the outer section 57 of the spokes 58. The total length of the spokes 59, however, is exactly the same as the total length of the spokes 58 and 55.

Moving clockwise from the fixed spoke 54 and counterclockwise therefrom the next rearward spokes 62, are formed in the same manner as the spokes 58 and 59 and the inner section of the spokes 62 is slightly longer than the inner sections of the adjacent spokes 59, while the outer section of the spokes 62 is slightly shorter than the outer section of the spoke 59. The total length of the spokes 62 will, of course, be the same as the total length of the other spokes of the wheel 49. The spokes 64 adjacent the spokes 62 are formed with three sections, having an inner section 65 fixed to the hub 50, an intermediate section 66 hingedly connected to the outer end of the fixed inner section 65, and an extreme outer end section 67 hingedly connected to the outer end of the intermediate link or section 66. A similar spoke 68 is mounted on the hub 50 adjacent each of the spokes 64 and is formed with three sections, the innermost section being fixed to the hub 50 and formed with a pivot pin on which an elongated intermediate link or section 69 is hingedly connected. An outer section 70 is hingedly connected to the outer end of the intermediate link 69, the total length of the spoke 68 being the same as the total length of the other spokes, and the intermediate link 69 being slightly longer than the intermediate link 66 of the adjacent double-hinged spoke 64. The spoke 71, diametrically opposed to the rigid spoke or master spoke 55, is formed between the double-hinged spokes 68 and has an innermost section 72, fixed to the hub 50 and slightly longer than the length of the innermost section 68. An elongated intermediate link 74 in hingedly connected to the outer end of the section 72 and the outer end portion or section 75 of the spoke 71 is hingedly connected to the outer end of the intermediate link 74, as clearly shown in Figure 4 of the drawings. The formation and disposition of the various spokes 54, as described above, provide for the folding of the spokes about the hub 50 into a mutually overlying adjacent relation, as clearly shown in Figure 4 of the drawings, and swingable about their respective pivot points to an outwardly-extended or erected position, as clearly shown in Figures 1 and 3 of the drawings.

As seen in Figure 11, each of the hingedly-connected links 54 is U-shaped in configuration for defining a longitudinally-extending channel 76 and a longitudinally-extending locking bar 77 is hingedly connected to the outermost section of each of the spokes 54 and is engageable in the channel 76 inwardly of the spoke for fixedly securing the pivotally-connected sections in their extended pivoted position. The locking bar 77 is pivotally connected by a pivot pin 78 to the outermost section of each of the hinge spokes 54 and is adapted to be seated in the channel section 56 of each of the spoke sections. An aperture 79 is formed in the outer end of the locking bar 77 and a locking bolt 80 is adapted to be engaged through the aperture 78 and through a registering aperture in the innermost section of each of the spokes 54 to be secured therein by a nut 81, whereby the spokes 54 will be secured in their extended position and held against pivotal movement when the locking bar 77 is fixedly secured at the end thereof opposite from the pivot pin 78.

Means 82 is provided for forming the rim of the wheel sections and for securing the spokes in circumferential spaced relation, the means being hingedly connected between adjacent wheel spokes 54, and foldable to provide for the folding of the spokes 54 about the hub 50. The means 82, as seen in Figure 5, includes a pair of longitudinally-extending, U-shaped links or rim members 84 and 85 hingedly connected together at their adjacent inner ends and hingedly connected at their outer ends to adjacent spokes 54. As shown in Figure 7 of the drawings, locking means 86 is provided and is interposed in the rim members, the means forming a part of the rim between a pair of adjoining spokes and being adjustable along the length thereof to provide for the compensation of the slack between the pivot connections of the other circumferentially-arranged rim members 82. The locking means 86 is formed of a pair of U-shaped sections 87 and 88 connected together by a turnbuckle 89. One screw 90 is fixedly connected in one of the rim sections, as the rim section 88, while a similar oppositely-threaded screw 91 is fixedly connected in the adjacent section of the adjacent rim member 87 and a threaded nut element 92 is engaged on the confronting screws 90 and 91 to provide for the turnbuckle type of adjustment of the link 86. In the use and operation of the portable and foldable Ferris wheel 15, the Ferris wheel is initially folded to a position, as clearly shown in Figure 8 of the drawings, with all of the spoke sections 84 in their folded and overlying relation to each other with the upper tower section 27 pivotally folded to its forwardly-extending position pivoted on the upper end of the lower tower section 24. The upper or forward end of the upper tower section 27 is adapted to be rested on a cradle 94 which is supported on the forward end of the trailer 16 and frame 19 immediately behind the motor 22. The rear ends of the folded spokes 54 are supported above the frame 19 by a U-shaped supporting member 95 which is hingedly connected at its upper end to a bracket or ear 96 on the forward side of the upper end of the lower tower section 25. The supporting member 95 includes a pair of vertically-extending side arms 97 connected together at their lower ends by a transverse bar 98, and the lowermost of the spoke members 54 is adapted to be seated at its rear end on the transverse member 98. The erecting member 36 is disposed in a forwardly-extending position overlying the uppermost of the spokes 54 and is free to be pivoted upwardly and outwardly for erecting the Ferris wheel 15.

Upon swinging of the erecting member 36 upwardly to a position perpendicular to the upper tower member 27, the erecting member 26 is restrained against further relative movement by the flexible member 40 which is fixed at its opposite ends to the erecting member 36 and to the upper end of the upper tower section 27. The cable 99, fixed at one end to the erecting member 36, is trained downwardly and forwardly about a pulley 100 which is supported on the rear end of the frame 19 and is directed forwardly for engagement with a suitable winding drum and power means, not shown in the drawings. Upon tensioning of the cable 99, the erecting member 36 is swung upwardly about the pivot pin 32, carrying with it the folded wheel spokes 54. When the upper tower section 27 is positioned in alignment with the lower tower section 25, the locking member 34 is engaged through the rear end of the plates 30 and 31 for fixing the tower 24 in its extended position. At this time the erecting member 36 will be disengaged from the upper tower section 27 and stored in a suitable place on the trailer 16. The spoke-confining member 95 will then be removed from its engagement with the brackets 96 carried by the upper ends of the lower tower sections 25 and stored away with the erecting member 36.

The rim members 82 are then extended for swinging the respective radial spoke sections 54 to a circumferentially-spaced-apart position, as clearly shown in Figure 3 of the drawings, and the locking bars 77 pivotally carried by the spokes 54 are engaged in the channels 76 of the respective spokes and secured in place by the locking bolt 80 for fixedly securing the respective spoke sections in aligned extended position. The wheel sections 49 are transversely spaced apart, at all times, by brace bars 105, as seen in Figure 2, with diagonal braces 106 connecting the bars. The braces and bars do not interfere with the folding of the spokes, since as seen in Figure 5, the rim sections which are connected by the bars, can fold into a collapsed position, with the spokes overlying the fixed spoke. With the wheels 49 in their fully-extended positions, the seats 100 are swingably connected between the transversely-spaced-apart wheels 49 on the outer ends of the radially-extending spokes 54. The seats 100 are supported in a substantially conventional manner and then the guy wires 101 are fixed or connected between the extreme upper ends of the upper tower sections and the outer ends of the frame 19 for supporting the tower 24 against longitudinal movement on the trailer 16 during the operation of the wheels 49. The Ferris wheel 15 is actuated in a substantially conventional manner by a winding drum 102 having wound thereabout a suitable cable 104 which is engaged about the periphery of the wheels 49 in a conventional manner to effect the rotation of the wheels 49.

The disassembly of the Ferris wheel 15 is accomplished by a procedure exactly reverse from the procedure of erection and the Ferris wheel 15 will then be folded from its extended position, as shown in Figure 1 of the drawings, to its fully retracted or folded position, as clearly shown in Figure 8 of the drawings.

I do not mean to confine myself to the exact details of construction herein disclosed, but claim all variations falling within the purview of the appended claims.

I claim:

1. In a portable Ferris wheel, a mobile frame, a pair of vertical towers mounted on said frame in laterally spaced relation to each other across the frame, said towers comprising lower sections fixed on said frame and upper sections hinged on the upper ends of the lower sections to swing from reclining horizontal positions to vertical erect positions in vertical alignment with the lower sections, locking means acting between the lower and upper tower sections for locking the upper sections in erect position on the lower sections, bearings on the upper ends of the upper sections, an axle extending between the upper ends of the upper sections and supportably engaged with the bearings, a hub journaled on said axle between the towers, and a wheel comprising a main spoke assembly comprising a spoke radiating from said hub and fixed to extend rigidly therefrom, a plurality of secondary spoke assemblies connected to said hub at equally circumferentially spaced points around the hub from said main spoke, each of said secondary spokes comprising an inner spoke section having its radially inward end pivoted on the hub on an axis extending parallel to the axis of the hub whereby the secondary spokes can be swung from a normal radial relation to the hub to folded positions in which adjacent spokes are alongside of each other and extend along said main spoke assembly, each of said secondary spokes having an outer spoke section, means pivotally connecting the outer spoke section to the inner spoke section to swing on an axis parallel to the axis of the hub from a normal position in longitudinal alignment with the inner spoke section to a folded position in which the outer spoke sections are disposed alongside of each other in substantially right angular relationship to the inner spoke sections, first locking means for locking the inner and outer spoke sections in longitudinal alignment with each other, folding link members extending between the radially outward ends of the outer sections of adjacent spokes, said folding link members comprising links having inner ends pivoted together and outer ends pivoted to the radially outward ends of the outer spoke sections, second locking means for locking the links in longitudinal alignment with each other so as to hold adjacent spokes spread away from each other and in radial relation to said hub.

2. In a portable Ferris wheel, a mobile frame, a pair of vertical towers mounted on said frame in laterally spaced relation to each other across the frame, said towers comprising lower sections fixed on said frame and upper sections hinged on the upper ends of the lower sections to swing from reclining horizontal positions to vertical erect positions in vertical alignment with the lower sections, locking means acting between the lower and upper tower sections for locking the upper sections in erect position on the lower sections, bearings on the upper ends of the upper sections, an axle extending between the upper ends of the upper sections and supportably engaged with the bearings, a hub journaled on said axle between the towers, and a wheel comprising a main spoke assembly comprising a spoke radiating from said hub and fixed to extend rigidly therefrom, a plurality of secondary spoke assemblies connected to said hub at equally circumferentially spaced points around the hub from said main spoke, each of said secondary spokes comprising an inner spoke section having its radially inward end pivoted on the hub on an axis extending parallel to the axis of the hub whereby the secondary spokes can be swung from a normal radial relation to the hub to folded positions in which adjacent spokes are alongside of each other and extend along said main spoke assembly, each of said secondary spokes having an outer spoke section, means pivotally connecting the outer spoke section to the inner spoke section to swing on an axis parallel to the axis of the hub from a normal position in longitudinal alignment with the inner spoke section to a folded position in which the outer spoke sections are disposed alongside of each other in substantially right angular relationship to the inner spoke sections, first locking means for locking the inner and outer spoke sections in longitudinal alignment with each other, folding link members extending between the radially outward ends of the outer sections of adjacent spokes, said folding link members comprising links having inner ends pivoted together and outer ends pivoted to the radially outward ends of the outer spoke sections, second locking means for locking the links in longitudinal alignment with each other so as to hold adjacent spokes spread away from each other and in radial relation to said hub, said wheel having a contractible member extending between and connected to two adjacent spokes serving to contract the adjacent spokes toward each other so as to tension the outer spokes in spread relation to each other.

WILLIAM G. CATLETT.

REFERENCES CITED

The following references are of record in the file of this patent:

UNITED STATES PATENTS

| Number | Name | Date |
|---|---|---|
| 669,621 | Conderman | Mar. 12, 1901 |
| 865,584 | Fulton | Sept. 10, 1907 |
| 1,203,453 | Armitage | Oct. 31, 1916 |
| 1,262,687 | Miller | Apr. 16, 1918 |
| 1,263,370 | Brundage | Apr. 23, 1918 |
| 1,397,938 | Unger et al. | Nov. 22, 1921 |